US012566337B2

(12) United States Patent
Minamisawa

(10) Patent No.: US 12,566,337 B2
(45) Date of Patent: Mar. 3, 2026

(54) OPTICAL UNIT WITH SHAKE CORRECTION FUNCTION

(71) Applicant: NIDEC INSTRUMENTS CORPORATION, Nagano (JP)

(72) Inventor: Shinji Minamisawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 335 days.

(21) Appl. No.: 18/346,865

(22) Filed: Jul. 5, 2023

(65) Prior Publication Data

US 2024/0012266 A1 Jan. 11, 2024

(30) Foreign Application Priority Data

Jul. 7, 2022 (JP) ................................. 2022-109801

(51) Int. Cl.
*G02B 27/64* (2006.01)
*G03B 5/00* (2021.01)
(52) U.S. Cl.
CPC ............. *G02B 27/646* (2013.01); *G03B 5/00* (2013.01); *G03B 2205/0023* (2013.01); *G03B 2205/0069* (2013.01)
(58) Field of Classification Search
CPC ...... G02B 27/646; G02B 27/64; H04N 23/57; H04N 23/68; H04N 23/682; H04N 23/685; H04N 23/687; G03B 5/00; G03B 2205/0023; G03B 2205/0069; G03B 5/06; G03B 2205/00; G03B 2205/0007; G03B 2205/0053; G03B 2217/005
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

2020/0257131 A1* 8/2020 Arai .......................... G03B 5/06
2021/0223661 A1 7/2021 Minamisawa et al.
2021/0278689 A1* 9/2021 Kasahara ........... H02K 41/0356
2024/0015401 A1* 1/2024 Minamisawa ......... H04N 23/57

FOREIGN PATENT DOCUMENTS

JP 2020027134 2/2020
JP 2021124711 8/2021

* cited by examiner

*Primary Examiner* — Arnel C Lavarias
(74) *Attorney, Agent, or Firm* — JCIPRNET

(57) ABSTRACT

In this optical unit with a shake correction function, a band-shaped portion is constituted by a plurality of flexible printed circuit boards overlapping each other with a predetermined gap, and is bent at a boundary between a first band-shaped portion and a second band-shaped portion and at a boundary between the second band-shaped portion and a third band-shaped portion. The plurality of flexible printed circuit boards are bonded and fixed to each other at least at one of the first bent portion and the second bent portion.

9 Claims, 9 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2022-109801 filed Jul. 7, 2022, the entire content of which is incorporated herein by reference.

BACKGROUND

Field of the Invention

At least an embodiment of the present invention relates to an optical unit with a shake correction function mounted in a mobile device or the like.

Description of the Related Documents

An optical unit with a shake correction function mounted in a mobile device or the like has been known (see Japanese Patent Application Publication No. JP2020-27134, for example). The optical unit described in Japanese Patent Application Publication No. 2020-27134 includes a movable body having a camera module (an optical module), a fixed body that rotatably holds the movable body, and a wiring board which is pulled out from the camera module. The movable body is rotatable with respect to the fixed body with an optical axis of the camera module as a rotation center, and the optical unit described in Japanese Patent Application Publication No. 2020-27134 is capable of shake correction in a rolling direction. Moreover, this optical unit is also capable of the shake correction in a pitching direction and the shake correction in a yawing direction.

In the optical unit described in Patent Application Publication No. 2020-27134, the fixed body has an external casing that is disposed on an outer peripheral side of the movable body. The wiring board is a flexible printed circuit board and has a pull-out portion that is pulled out from the camera module and a band-shaped pull-around portion connecting to the pull-out portion and pulled around along an outer peripheral surface of the external casing. The pull-out portion is disposed so that a thickness direction of the pull-out portion matches an optical axis direction of the camera module, and the pull-around portion is disposed so that a width direction of the pull-around portion matches the optical axis direction of the camera module. The wiring board is bent at a right angle at a boundary between the pull-out portion and the pull-around portion. Moreover, the wiring board is bent at a right angle at an intermediate position of the pull-around portion.

As a conventional optical unit with a shake correction function mounted on a mobile device and the like, such an optical unit with a shake correction function is known that includes a movable body having a camera module (optical module), a fixed body that rotatably holds the movable body, a drive mechanism that rotates the movable body with respect to the fixed body, and a wiring board that is pulled out from the camera module (see, for example, Japanese Patent Application Publication No. 2021-124711). In the optical unit described in Japanese Patent Application Publication No. 2021-124711, the wiring board is constituted by three flexible printed circuit boards. The three flexible printed circuit boards overlap each other with a predetermined gap in the thickness direction of the flexible printed circuit boards.

In the optical unit described in Japanese Patent Application Publication No. 2021-124711, the three flexible printed circuit boards overlap each other with a predetermined gap between them and thus, flexibility of the wiring board can be improved in this optical unit. Therefore, in this optical unit, it is possible to flexibly deform the wiring board in response to a rotating operation of the camera module, and as a result, it is possible to reduce a load acting on the drive mechanism when the camera module performs the rotating operation. In addition, since this optical unit can reduce the load acting on the drive mechanism, power consumption of the drive mechanism can be reduced.

The inventor of this application has developed an optical unit with a shake correction function that performs the shake correction in the pitching direction and the shake correction in the yawing direction, for example. This optical unit with a shake correction function has, for example, a movable body having a camera module, a fixed body that rotatably holds the movable body, a drive mechanism for rotating the movable body with respect to the fixed body so that the optical axis of the camera module is inclined in an arbitrary direction, and a wiring board connecting to the camera module. The wiring board has a module-side mounted portion that is fixed to the camera module, a fixed-side fixed portion that is fixed to the fixed body, and a band-shaped portion that connects the module-side mounted portion and the fixed-side fixed portion.

In the optical unit with a shake correction function under development, by assuming that a side on which a subject is disposed in the optical axis direction, which is the direction of the optical axis of the camera module, is a subject side, and a side opposite to the subject side is an anti-subject side, the module-side mounted portion is fixed to an end part on the anti-subject side of the camera module. Moreover, in the optical unit with a shake correction function under development, the band-shaped portion of the wiring board has a first band-shaped portion having one end connecting to the module-side mounted portion, a second band-shaped portion having one side connecting to the other end side of the first band-shaped portion, and a third band-shaped portion having one end connecting to the other end of the second band-shaped portion and the other end connecting to the fixed-side fixed portion, and similarly to the optical unit described in Japanese Patent Application Publication No. 2020-27134, it is bent at the boundary between the first band-shaped portion and the second band-shaped portion and the boundary between the second band-shaped portion and the third band-shaped portion.

In the optical unit with a shake correction function under development, in order to secure the flexibility of the band-shaped portions and to reduce the load on the drive mechanism when the camera module performs the rotating operation, the inventor examines configuration of the band-shaped portion by a plurality of flexible printed circuit boards that overlap each other with a predetermined gap, as in the optical unit described in Japanese Patent Application Publication No. 2021-124711. However, the inventor's examination revealed that, in the optical unit with a shake correction function under development, if the band-shaped portion is constituted by a plurality of flexible printed circuit boards that overlap each other with a predetermined gap, there is a concern that nonconformity can occur when the band-shaped portion is bent.

Specifically, the inventor's examination revealed that, if the band-shaped portion is bent at the boundary between the first band-shaped portion and the second band-shaped portion, there is a concern that end surfaces on the subject sides of the plurality of flexible printed circuit boards are shifted on the one end side of the second band-shaped portion connecting to the first band-shaped portion. For example, as shown in FIG. 9A, the inventor's examination revealed that, when the band-shaped portion is constituted by two flexible printed circuit boards 101 and 102, on the one end side of a second band-shaped portion 104, there is a concern that the end surface on the subject side of the flexible printed circuit board 101 disposed on an inner side at a first bent portion 105 formed at the boundary part between a first band-shaped portion 103 and the second band-shaped portion 104 can shift closer to the subject side than the end surface on the subject side of the flexible printed circuit board 102 disposed on an outer side in the first bent portion 105.

More specifically, the inventor's examination revealed that, since a radius of curvature at the first bent portion 105 of the flexible printed circuit board 101 is smaller than the radius of curvature at the first bent portion 105 of the flexible printed circuit board 102, and since on the other end part of the first band-shaped portion 103 connecting to the second band-shaped portion 104, the gap between the two flexible printed circuit boards 101, 102 can be widened, there is a concern that, on the one end side of the second band-shaped portion 104, the end surface on the subject side of the flexible printed circuit board 101 can shift closer to the subject side than the end surface on the subject side of the flexible printed circuit board 102. Note that, in FIG. 9A, peripheral portion around the first bent portion 105 of the flexible printed circuit boards 101 and 102 are illustrated from a predetermined direction orthogonal to the optical axis direction of the camera module.

If the end surface on the subject side of the flexible printed circuit board 101 is shifted closer to the subject side than the end surface on the subject side of the flexible printed circuit board 102 on the one end side of the second band-shaped portion 104, there is a concern that the end surface on the subject side of the flexible printed circuit board 101 contacts a component of the camera module at rotation of the camera module, which might cause damage to the flexible printed circuit board 101. Note that, though it is possible to correct the shift of the end surface on the subject side of the flexible printed circuit board 101 to the subject side, the inventor's examination has revealed that, even if the shift is corrected once, the shift of the end surface on the subject side of the flexible printed circuit board 101 to the subject side may recur over time.

Moreover, the inventor's examination revealed that, when the band-shaped portion is bent at the boundary between the second band-shaped portion and the third band-shaped portion, on the one end side of the third band-shaped portion connecting to the other end of the second band-shaped portion, large deflection can easily occur in the flexible printed circuit board disposed on an inner side at the second bent portion formed at the boundary portion between the second band-shaped portion and the third band-shaped portion. For example, as shown in FIG. 9B, when the band-shaped portion is constituted by two flexible printed circuit boards 101 and 102, the inventor has found out that, large deflection can easily occur on the flexible printed circuit board 101 disposed on the inner side at the second bent portion 107 on the one end side of the third band-shaped portion 106. In FIG. 9B, the peripheral portion around the second bent portion 107 of the flexible printed circuit boards 101 and 102 are illustrated from the optical axis direction of the camera module.

On the one end side of the third band-shaped portion 106, if the large deflection occurs in the flexible printed circuit board 101, there is a concern that a deflected part of the flexible printed circuit board 101 is brought into contact with a component of the camera module at the rotation of the camera module and might damage the flexible printed circuit board 101. Note that, though it is possible to correct the deflection of the flexible printed circuit board 101, the inventor's examination has revealed that, even if the deflection is corrected once, the deflection of the flexible printed circuit board 101 may recur over time.

Thus, at least an embodiment of the present invention is, in an optical unit with a shake correction function in which a wiring board connecting to a camera module includes a module-side mounted portion mounted on the camera module, a fixed-side fixed portion fixed to a fixed body, and a band-shaped portion connecting the module-side mounted portion and the fixed-side fixed portion, to provide an optical unit with a shake correction function which can suppress occurrence of nonconformity of the band-shaped portion, when the band-shaped portion is bent, even if the band-shaped portion is constituted by a plurality of flexible printed circuit boards that overlap each other with a predetermined gap.

SUMMARY

In an optical unit with a shake correction function of at least an embodiment of the present invention, including a camera module, a fixed body which holds the camera module, and a wiring board connecting to the camera module, the optical unit with a shake correction function is characterized in that the wiring board includes a module-side mounted portion mounted on the camera module, a fixed-side fixed portion fixed to the fixed body, and a band-shaped portion connecting the module-side mounted portion and the fixed-side fixed portion, the band-shaped portion includes a first band-shaped portion with one end connecting to the module-side mounted portion, a second band-shaped portion with one end side connecting to the other end side of the first band-shaped portion, and a third band-shaped portion with one end connecting to the other end of the second band-shaped portion and the other end connecting to the fixed-side fixed portion, is constituted by a plurality of flexible printed circuit boards, and is bent at a boundary between the first band-shaped portion and the second band-shaped portion and at a boundary between the second band-shaped portion and the third band-shaped portion, a thickness direction of the first band-shaped portion matches the width direction of the second band-shaped portion formed having a band shape and the width direction of the third band-shaped portion, the plurality of flexible printed circuit boards overlap each other with a predetermined gap from each other in the thickness direction of the flexible printed circuit boards and are bonded and fixed to each other at least at either one of a first bent portion formed at the boundary part between the first band-shaped portion and the second band-shaped portion and a second bent portion formed at the boundary part between the second band-shaped portion and the third band-shaped portion.

In the optical unit with a shake correction function of at least an embodiment of the present invention, the plurality of flexible printed circuit boards constituting the band-shaped portions of the wiring board are bonded and fixed to each other at least at either one of the first bent portion formed at the boundary part between the first band-shaped portion and the second band-shaped portion and the second bent portion formed at the boundary part between the second band-shaped portion and the third band-shaped portion. Thus, in at least an embodiment of the present invention, when the plurality of flexible printed circuit boards are bonded and fixed to each other at the first bent portion, it is possible to suppress the shift of the end surfaces on the subject sides of the plurality of the flexible printed circuit boards on one end side of the second band-shaped portion connecting to the first band-shaped portion.

Moreover, in at least an embodiment of the present invention, when the plurality of flexible printed circuit boards are bonded and fixed to each other at the second bent portion, it is possible to suppress the deflection generated in the flexible printed circuit board disposed on an inner side at the second bent portion on the one end side of the third band-shaped portion connecting to the other end of the second band-shaped portion. Therefore, in at least an embodiment of the present invention, even if the band-shaped portion is constituted by the plurality of flexible printed circuit boards that overlap each other with a predetermined gap, it possible to suppress occurrence of nonconformities in the band-shaped portion when the band-shaped portion is bent.

In at least an embodiment of the present invention, the plurality of flexible printed circuit boards are bonded and fixed to each other at the first bent portion and the second bent portion. By configuring as above, it becomes possible to suppress the shift of the end surfaces on the subject sides of the plurality of flexible printed circuit boards on the one end side of the second band-shaped portion and the deflection generated in the flexible printed circuit board disposed on the inner side at the second bent portion on the one end side of the third band-shaped portion.

In at least an embodiment of the present invention, for example, the band-shaped portion is bent at a right angle at the first bent portion and the second bent portion.

In at least an embodiment of the present invention, an optical unit with a shake correction function includes, for example, a movable body having a camera module, a fixed body that rotatably holds the movable body, and a drive mechanism for rotating the movable body with respect to the fixed body so that the optical axis of the camera module is inclined in an arbitrary direction, and a module-side mounted portion is fixed to the camera module.

Moreover, in at least an embodiment of the present invention, the optical unit with a shake correction function may include, for example, a drive mechanism for causing the module-side mounted portion capable of moving with respect to the fixed body on a predetermined plane orthogonal to the optical axis of the camera module to move with respect to the fixed body.

In at least an embodiment of the present invention, the band-shaped portion is constituted by two flexible printed circuit boards, and assuming that one of the two flexible printed circuit boards is a first flexible printed circuit board and the other flexible printed circuit board is a second flexible printed circuit board, the first flexible printed circuit board has a two-layer structure in which a wiring pattern are formed on both surface sides, and the second flexible printed circuit board has a one-layer structure in which the wiring pattern is formed on one surface side, and the first flexible printed circuit board is disposed on the inner side of the second flexible printed circuit board at the first bent portion and the second bent portion.

In other words, in at least an embodiment of the present invention, the first flexible printed circuit board, which has a two-layer structure and has a large thickness, is disposed on the inner side of the second flexible printed circuit board, which has a one-layer structure and has a smaller thickness, at the first bent portion and the second bent portion. By configuring as above, it becomes easier to bend the band-shaped portion at the first bent portion and the second bent portion as compared with a case where the first flexible printed circuit board is disposed on an outer side of the second flexible printed circuit board at the first bent portion and the second bent portion, and also becomes easier to prevent damage to the first flexible printed circuit board when being bent at the first bent portion and the second bent portion.

In at least an embodiment of the present invention, the plurality of flexible printed circuit boards are bonded and fixed to each other at the first bent portion, and the first bent portion has a curved shape, and the plurality of flexible printed circuit boards are bonded and fixed to each other in a whole area of the first bent portion having a curved shape. By configuring as above, it becomes possible to effectively suppress the shifting of the end surfaces on the subject sides of the plurality of flexible printed circuit boards at the one end side of the second band-shaped portion.

In at least an embodiment of the present invention, one end of the second band-shaped portion is disposed closer to the one end side of the first band-shaped portion than the other end of the first band-shaped portion, and the plurality of flexible printed circuit boards are bonded and fixed to each other in a whole area between the one end of the second band-shaped portion and the other end of the first band-shaped portion in a longitudinal direction of the band-shaped portion.

By configuring as above, for example, when the plurality of flexible printed circuit boards are bonded and fixed at the first bent portion using a sheet-state adhesive, it becomes possible to fix the plurality of flexible printed circuit boards using the sheet-state adhesive, which is larger than the portion to be bonded in the band-shaped portion in a manufacture process of the wiring board and then, to cut and to remove the sheet-state adhesive in accordance with the outer shape of a part of the band-shaped portion to be bonded. Therefore, as compared with a case where the plurality of flexible printed circuit boards are bonded and fixed only at the first bent portion using the sheet-state adhesive, it becomes possible to easily perform the bonding and fixing work of the plurality of flexible printed circuit boards in the manufacture process of the wiring board.

In at least an embodiment of the present invention, the plurality of flexible printed circuit boards are bonded and fixed to each other at the second bent portion, and the second bent portion has a curved shape, and the plurality of flexible printed circuit boards are bonded and fixed to each other in a whole area of the second bent portion having a curved shape. By configuring as above, it becomes possible to effectively suppress the deflection generated in the flexible printed circuit board disposed on the inner side at the second bent portion on the one end side of the third band-shaped portion.

As described above, in at least an embodiment of the present invention, in an optical unit with a shake correction function in which a wiring board connecting to a camera module includes a module-side mounted portion mounted on the camera module, a fixed-side fixed portion fixed to a fixed body, and a band-shaped portion connecting the module-side mounted portion and the fixed-side fixed portion, even if the band-shaped portion is constituted by a plurality of flexible printed circuit boards that overlap each other with a predetermined gap, it becomes possible to suppress occurrence of nonconformities in the band-shaped portion when the band-shaped portion is bent.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIG. 5A is a plan view, and FIG. 5B is a perspective view of the wiring board shown from an anti-subject side;

DETAILED DESCRIPTION

In the following, embodiments of the present invention will be explained with reference to the drawings.

Figure 1:
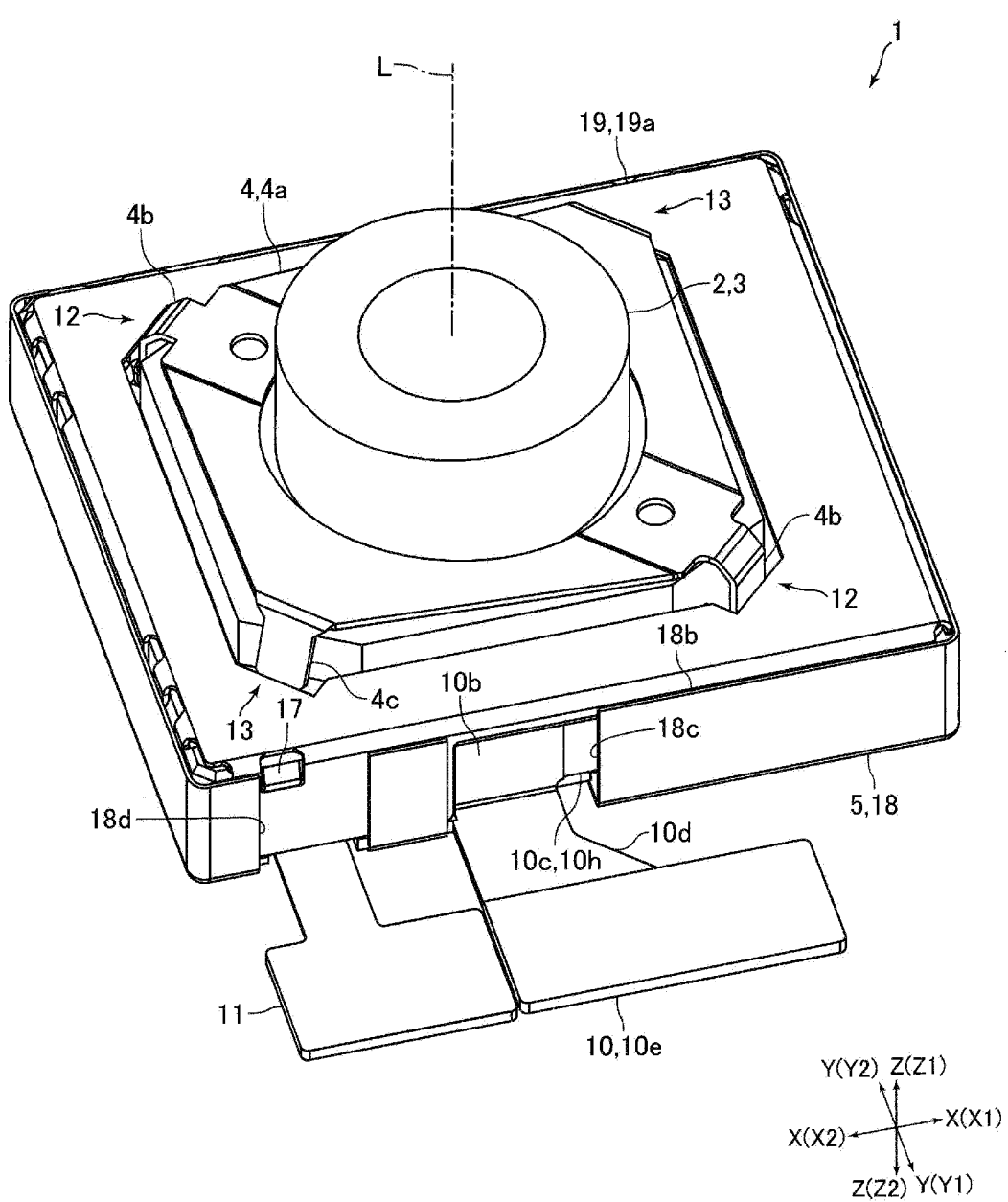
FIG. 1 is a perspective view of an optical unit with a shake correction function according to an embodiment of the present invention.
Figure 2:
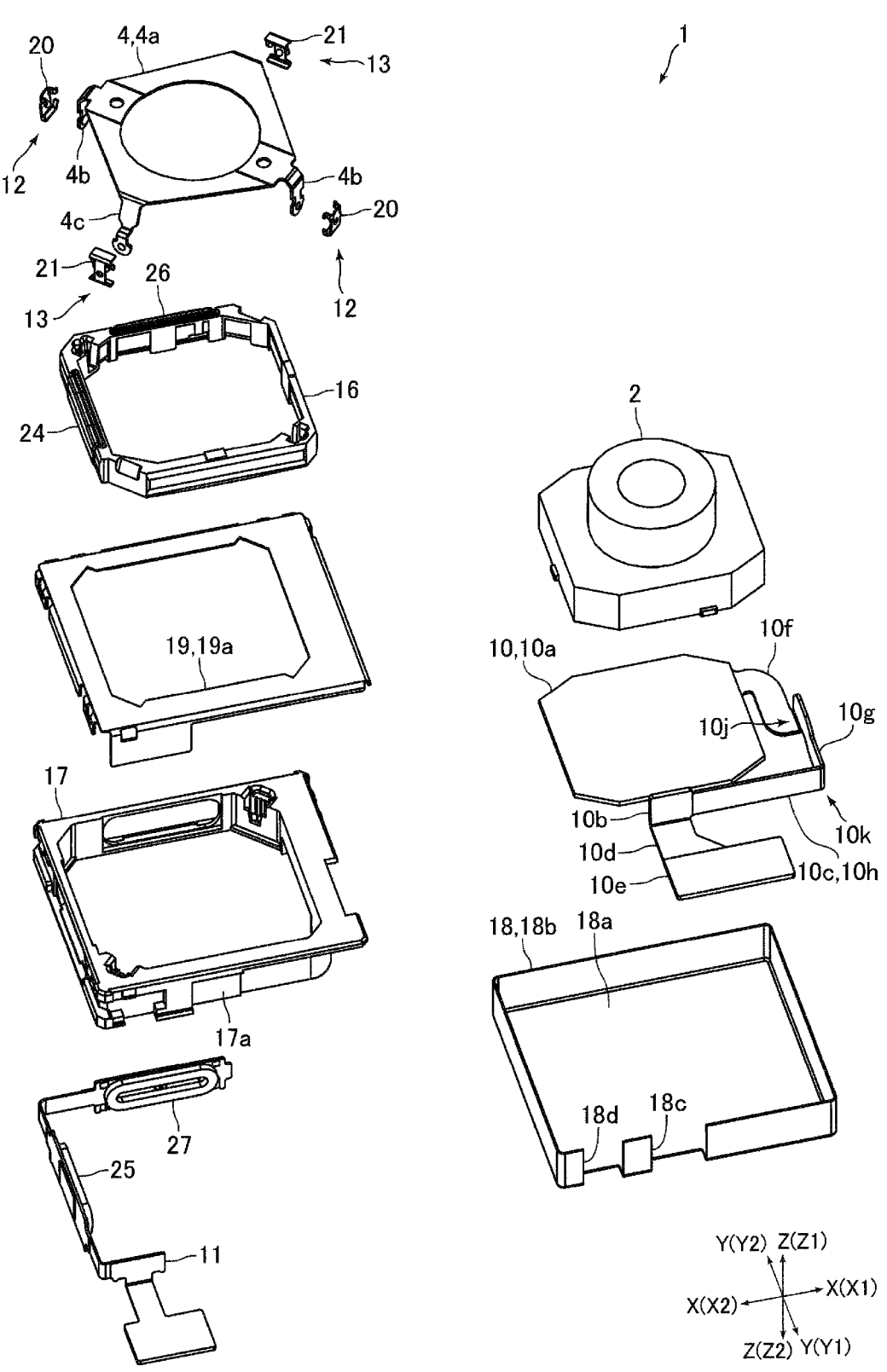
FIG. 2 is an exploded perspective view of the optical unit with a shake correction function shown in FIG. 1.
Figure 3:
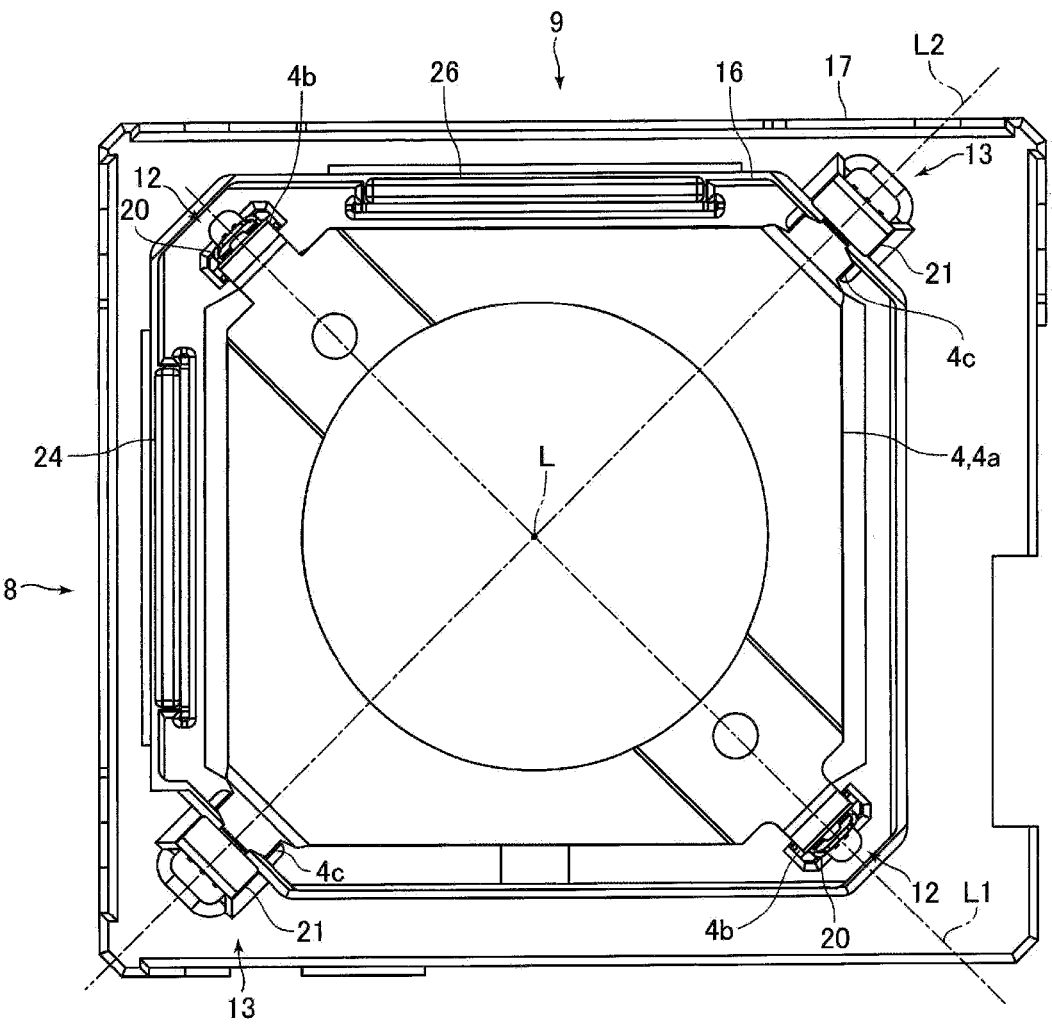
FIG. 3 is a plan view of a state where a camera module, a wiring board, and a cover member are removed from the optical unit with a shake correction function shown in FIG. 1.
Figure 3:
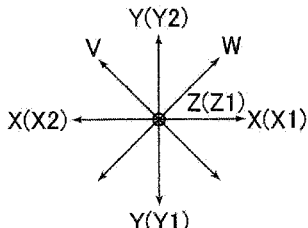

Overall Configuration of Optical Unit with Shake Correction Function FIG. 1 is a perspective view of an optical unit 1 with a shake correction function according to an embodiment of the present invention. FIG. 2 is an exploded perspective view of the optical unit 1 with a shake correction function shown in FIG. 1. FIG. 3 is a plan view of a state where a camera module 2, a wiring boards 10, 11, and cover members 18, 19 are removed from the optical unit 1 with a shake correction function shown in FIG. 1.

In the following explanation, as shown in FIG. 1 and the like, each of three directions orthogonal to one another is referred to as an X-direction, a Y-direction, and a Z-direction, and the X-direction is referred to as a left-right direction, the Y-direction as a front-back direction, and the Z-direction as an up-down direction. Moreover, an X1-direction side in FIG. 1 and the like, which is one side in the left-right direction, is referred to as a "right" side, while an X2-direction side in FIG. 1 and the like, which is a side opposite thereto, as a "left" side, a Y1-direction side in FIG. 1 and the like, which is one side in the front-back direction, as a "front" side, while a Y2-direction side in FIG. 1 and the like, which is a side opposite thereto, as a "back" side, and a Z1-direction side in FIG. 1 and the like, which is one side in the up-down direction, as an "upper" side, while a Z2-direction side in FIG. 1 and the like, which is a side opposite thereto, as a "lower" side.

The optical unit 1 with a shake correction function of this embodiment (hereinafter referred to as an "optical unit 1") is a small-sized and thin unit to be mounted in a mobile device such as a smartphone, for example, and includes a camera module 2 having a lens for photographing and an image pickup element. The optical unit 1 has a shake correction function to avoid disruption in an image captured when shake occurs during photographing. Specifically, the optical unit 1 includes a shake correction function in a pitching direction and a yawing direction.

The optical unit 1 is formed having a flat cuboid shape with a small thickness as a whole. The optical unit 1 in this embodiment is formed to have a regular-square shape when viewed from an optical axis direction, which is a direction of an optical axis L of the camera module 2. Four side surfaces of the optical unit 1 are parallel to a ZX plane, which is constituted by the left-right direction and the up-down direction or a YZ plane, which is constituted by the front-back direction and the up-down direction.

The optical unit 1 includes a movable body 3 (see FIG. 1) including the camera module 2, an intermediate member 4 that rotatably holds the movable body 3, and a fixed body 5 (see FIG. 1) that rotatably holds the intermediate member 4. The movable body 3 can be rotated with respect to the intermediate member 4 with a first crossing direction (V-direction in FIG. 3) that intersects the optical axis L of the camera module 2 as an axis direction of the rotation. In other words, the movable body 3 is rotatable with respect to the intermediate member 4 around a first axis L1 (see FIG. 3) as a rotation center with the first crossing direction as the axial direction. The first crossing direction in this embodiment is orthogonal to the optical axis L.

The intermediate member 4 can be rotated with respect to the fixed body 5 with a second crossing direction (W-direction in FIG. 3), which intersects the first crossing direction and intersects the optical axis L of the camera module 2, as the axial direction of the rotation. In other words, the intermediate member 4 can be rotated with respect to the fixed body 5 with a second axis L2 (see FIG. 3), which has the second crossing direction as its axis direction, as a rotation center. In this embodiment, the second crossing direction is orthogonal to the first crossing direction. As described above, a two-axis gimbal mechanism is constituted between the movable body 3 and the fixed body 5.

In this embodiment, when an electric current is not supplied to a first drive coil 25 and a second drive coil 27 described below, the movable body 3 and the intermediate member 4 are disposed at predetermined reference positions, and the optical axis L of the camera module 2 is disposed at a predetermined reference position. When the movable body 3 and the intermediate member 4 are disposed at the reference positions and the optical axis L of the camera module 2 is at the reference position, the optical axis direction of the camera module 2 matches the up-down direction. When the shake correction is performed in the pitching direction and the yawing direction, inclination of the optical axis L of the camera module 2 with respect to the up-down direction is slight. Therefore, the optical axis direction of the camera module 2 substantially matches the up-down direction.

Moreover, when the movable body 3 is disposed at the predetermined reference position, the second crossing direction (W-direction) is orthogonal to the optical axis L. In other words, when the movable body 3 is disposed at the predetermined reference position and is not rotated with respect to the intermediate member 4, the second crossing direction is orthogonal to the optical axis L. On the other hand, when the movable body 3 is rotated with respect to the intermediate member 4, the second crossing direction intersects the optical axis L, but not at a right angle. The second crossing direction (W-direction) is a direction shifted in a clockwise direction in FIG. 3 by approximately 45° with respect to the front-back direction when viewed from above.

The optical unit 1 includes drive mechanisms 8, 9 for rotating the movable body 3 with respect to the fixed body 5 so that the optical axis L of the camera module 2 is inclined in an arbitrary direction (see FIG. 3). Moreover, the optical unit 1 has a wiring board 10 connecting to the camera module 2 and a wiring board 11 on which the first drive coil 25, which will be described below, constituting a part of the drive mechanism 8, and the second drive coil 27, which will be described below, constituting a part of the drive mechanism 9 are mounted. A first fulcrum portion 12, which is a fulcrum of rotation of the movable body 3 with respect to the intermediate member 4, is disposed at both end parts of the intermediate member 4 in the first crossing direction. A second fulcrum portion 13, which is a fulcrum of rotation of the intermediate member 4 with respect to the fixed body 5, is disposed at the both end parts of the intermediate member 4 in the second crossing direction.

The movable body 3 is formed having a flat and substantially cuboid shape with a small thickness in the optical axis direction as a whole. The movable body 3 includes a holder 16 to which the camera module 2 is fixed. The holder 16 is formed of a resin material. The holder 16 is formed having a regular-square frame shape, and when viewed from the up-down direction in a state where the movable body 3 and the intermediate member 4 are disposed at the reference positions, an outer shape of the holder 16 has a regular-square shape. Moreover, when the movable body 3 and the intermediate member 4 are disposed at the reference positions, two of the four sides that constitute the outer peripheral surfaces of the holder 16, which has a regular-square outer shape, are parallel to the front-back direction, while the remaining two sides are parallel to the left-right direction.

The camera module 2 is fixed to an inner peripheral surface of the holder 16 so that the outer peripheral side of the camera module 2 is covered by the holder 16. As described above, the camera module 2 includes a lens and an image pickup element. The image pickup element is disposed on a lower end side of the camera module 2, and a subject disposed on an upper side of the camera module 2 is photographed by the camera module 2.

As described above, the inclination of the optical axis L of the camera module 2 with respect to the up-down direction when the shake correction in the pitching direction and the yawing direction is performed is slight, and the optical axis direction of the camera module 2 substantially matches the up-down direction. Therefore, supposing that one side in the optical axis direction of the camera module 2 (specifically, the side on which the subject is disposed in the optical axis direction of the camera module 2) is the subject side and the side opposite to the subject side (specifically, the side where the image pickup element is disposed in the optical axis direction of the camera module 2) is the anti-subject side, the subject side substantially matches the upper side and the anti-subject side substantially matches the lower side.

The intermediate member 4 is formed of a metallic material such as stainless steel. Moreover, the intermediate member 4 is a plate spring formed by bending a metal plate having a spring characteristic into a predetermined shape. The intermediate member 4 is constituted by a base portion 4a that is disposed above the holder 16, two arm portions 4b that extend from the base portion 4a toward both sides in the first crossing direction, and two arm portions 4c that extend from the base portion 4a toward the both sides in the second crossing direction. The base portion 4a is formed having a substantially regular-square frame shape. An upper end part of the camera module 2 is disposed on an inner peripheral side of the base portion 4a.

Distal end sides of the arm portions 4b and 4c are bent toward lower sides. The arm portions 4b are disposed on the inner peripheral side of the holder 16. The arm portions 4c are disposed on the outer peripheral side of the holder 16. Moreover, the arm portions 4c are disposed on the inner peripheral side of a case body 17, which will be described below, constituting a part of the fixed body 5. A hemispherical recess portion in which a part of a spherical body constituting a part of the first fulcrum portion 12 is disposed is formed on the distal end part of the arm portion 4b. A hemispherical recess portion in which a part of a spherical body constituting a part of the second fulcrum portion 13 is disposed is formed on the distal end part of the arm portion 4c.

The fixed body 5 holds the movable body 3 rotatably via the intermediate member 4. Moreover, the fixed body 5 holds the camera module 2 via the intermediate member 4 and the holder 16, and the camera module 2 can be rotated with respect to the fixed body 5. The fixed body 5 includes a frame-shaped case body 17 that is disposed outside of the movable body 3 and the intermediate member 4, a cover member 18 that covers the side surfaces and a lower surface of the case body 17, and a cover member 19 that covers an upper surface of the case body 17. The case body 17 is formed of a resin material. The intermediate member 4 is rotatably held in the case body 17.

The case body 17 is formed having a flat square-cylinder shape with openings at both ends in the up-down direction. The upper surface of the case body 17 is a plane orthogonal to the up-down direction. The shape of the case body 17 when viewed from the up-down direction has a regular-square frame shape. When viewed from the up-down direction, two sides of the four sides that constitute the outer peripheral surfaces of the case body 17, each of which has a regular-square outer shape, are parallel to the front-back direction, while the remaining two sides are parallel to the left-right direction. The front side surface of the case body 17 has a fixed surface 17a to which the fixed-side fixed portion 10b described below constituting a part of the wiring board 10 is fixed is formed. The fixed surface 17a is disposed slightly to the left of the center of the case body 17 in the left-right direction. The fixed surface 17a is a plane orthogonal to the front-back direction.

The cover member 18 is formed having a square-cylinder shape with a bottom having a bottom portion 18a formed with a regular-square flat plate shape and a square-cylindrical cylinder portion 18b standing upward from the bottom portion 18a. An outer shape of the cover member 18 when viewed from the up-down direction is a regular square. When viewed from the up-down direction, two sides of the four sides constituting the outer peripheral surfaces of the cover member 18, which has a regular-square outer shape, are parallel to the front-back direction, while the remaining two sides are parallel to the left-right direction.

The bottom portion 18a constitutes a bottom surface of the optical unit 1. The cylinder portion 18b constitutes the side surfaces of the optical unit 1. The cylinder portion 18b covers the outer peripheral side of the case body 17 in almost a whole area in the up-down direction. On the front surface portion of the cover member 18, notched portions 18c, 18d for pulling out the wiring boards 10, 11 to the outer peripheral side of the optical unit 1 are formed. The wiring board 10 is pulled out so as to pass the notched portion 18c. The wiring board 11 is pulled out so as to pass the notched portion 18d. The notched portion 18d is formed on the left side of the notched portion 18c.

The cover member 19 is constituted mainly by a flat plate-shaped covering portion 19a that covers an upper surface of the case body 17. The cover member 19 is fixed to an upper end part of the case body 17. The covering portion 19a is formed having a regular-square frame shape. An outer shape of the cover member 19 when viewed from the up-down direction is a regular square. When viewed from the up-down direction, two sides of the four sides constituting the outer peripheral surfaces of the cover member 19, which has a regular-square outer shape, are parallel to the front-back direction, while the remaining two sides are parallel to the left-right direction. The camera module 2 and a part of the intermediate member 4 are disposed on the inner peripheral side of the covering portion 19a.

The first fulcrum portion 12 includes a support member 20 fixed to the holder 16 and a spherical body that is fixed to the support member 20. A part of the spherical body fixed to the support member 20 is disposed in the recess portion formed at the distal end part of the arm portion 4b. The spherical body is in contact with a bottom surface of the recess portion of the arm portion 4b from the outer side in the first crossing direction with a predetermined contact pressure by the spring characteristic of the arm portion 4b. The second fulcrum portion 13 includes a support member 21 fixed to the case body 17 and a spherical body fixed to the support member 21. A part of the spherical body fixed to the support member 21 is disposed in the recess portion formed at the distal end part of the arm portion 4c. The spherical body is in contact with a bottom surface of the recess portion of the arm portion 4c from the outer side in the second crossing direction with a predetermined contact pressure by the spring characteristic of the arm portion 4c.

The drive mechanism 8 includes a first drive magnet 24 and the first drive coil 25 that are opposed and disposed in the left-right direction. The drive mechanism 9 includes a second drive magnet 26 and the second drive coil 27 that are opposed and disposed in the front-back direction. The first drive magnet 24 and the second drive magnet 26 are formed having a rectangular flat-plate shape. The first drive coil 25 and the second drive coil 27 are, for example, air-core coils formed by winding a conductor around an air-core.

The first drive magnet 24 is disposed in a recess portion formed in a left side surface of the holder 16 and is fixed to a left surface side of the holder 16. The first drive coil 25 is disposed in a through hole formed in the left surface portion of the case body 17. Moreover, the first drive coil 25 is mounted on the wiring board 11. The drive mechanism 8 rotates the movable body 3 with respect to the fixed body 5 with an axis orthogonal to the optical axis L of the camera module 2 and parallel to the front-back direction as the rotation center.

The second drive magnet 26 is disposed in a recess portion formed in a rear side surface of the holder 16 and is fixed to a rear surface side of the holder 16. The second drive coil 27 is disposed in a through hole formed in the rear surface portion of the case body 17. Moreover, the second drive coil 27 is mounted on the wiring board 11. The drive mechanism 9 rotates the movable body 3 with respect to the fixed body 5 with an axis orthogonal to the optical axis L of the camera module 2 and parallel to the left-right direction as the rotation center.

The wiring board 11 is a flexible printed circuit board. The wiring board 11 is pulled around along the rear surface, the left side surface, and the front surface of the case body 17. Moreover, the wiring board 11 is pulled out from the left end part of the front surface of the cover member 18 toward the front side. The wiring board 11 is fixed to the outer peripheral surface of the case body 17.

In the optical unit 1, when a change in inclination of the movable body 3 is detected by a predetermined detection mechanism for detecting the change in the inclination of the movable body 3, an electric current is supplied to at least either one of the first drive coil 25 and the second drive coil 27 on the basis of a detection result of the detection mechanism, and a shake is corrected. The drive mechanisms 8 and 9 rotate the movable body 3 with respect to the fixed body 5 by using at least either one of the first axis L1 and the second axis L2 as the rotation center.

Configuration of Wiring Board

Figure 4A:
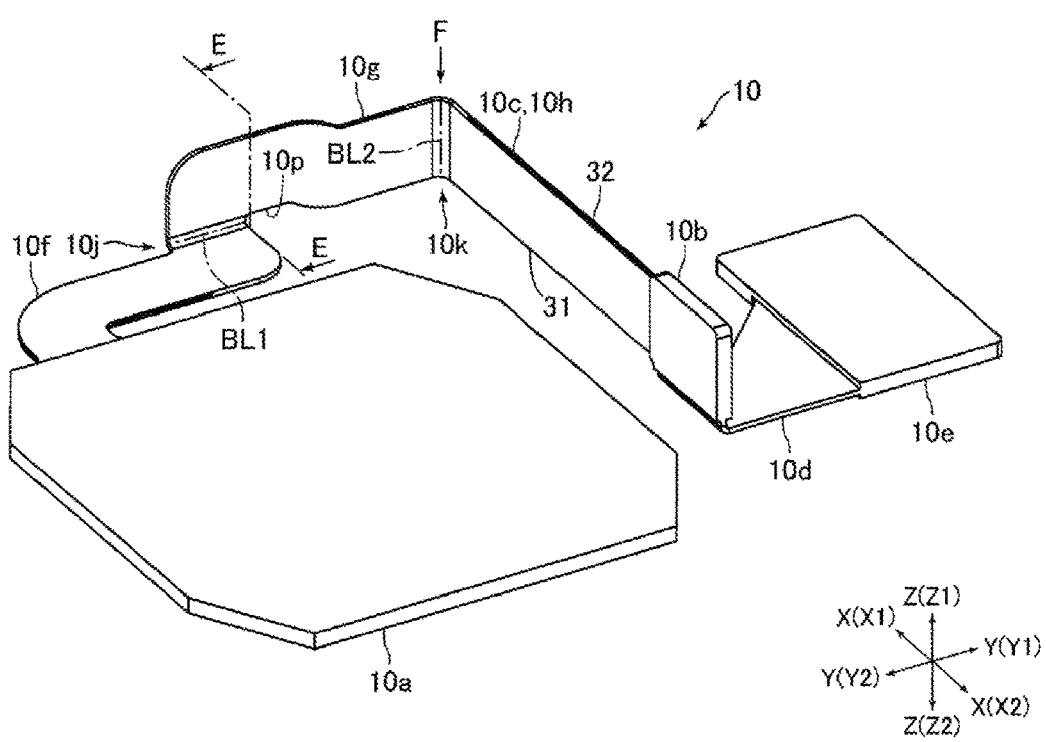
FIGS. 4A and 4B are perspective views illustrating the wiring board shown in FIG. 2 from a different direction.
Figure 4B:
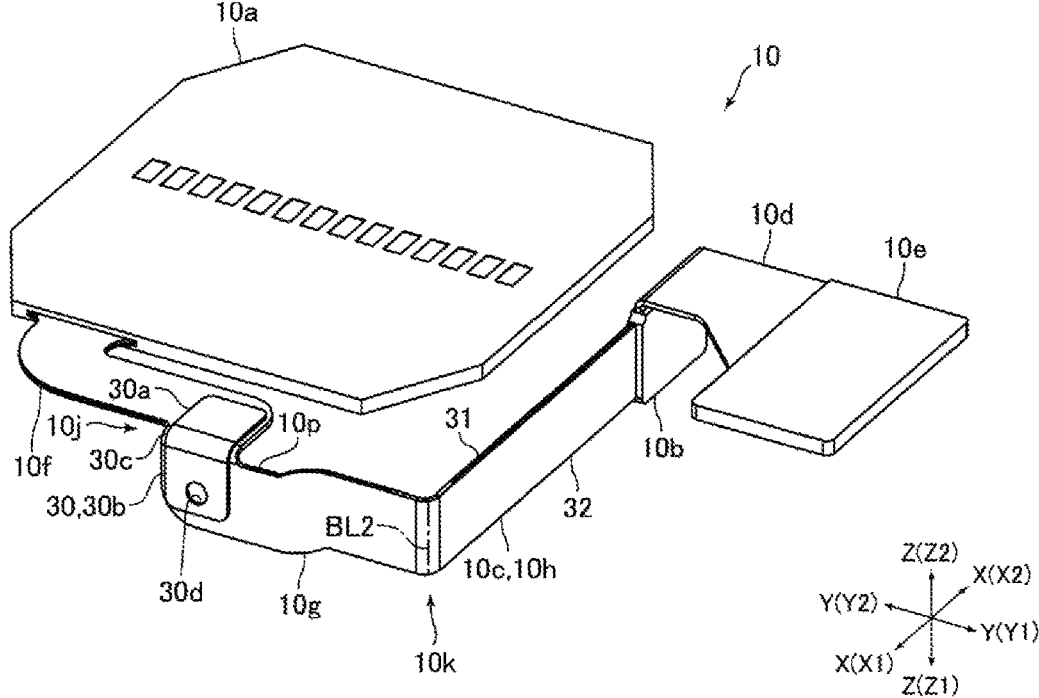
Figure 5A:
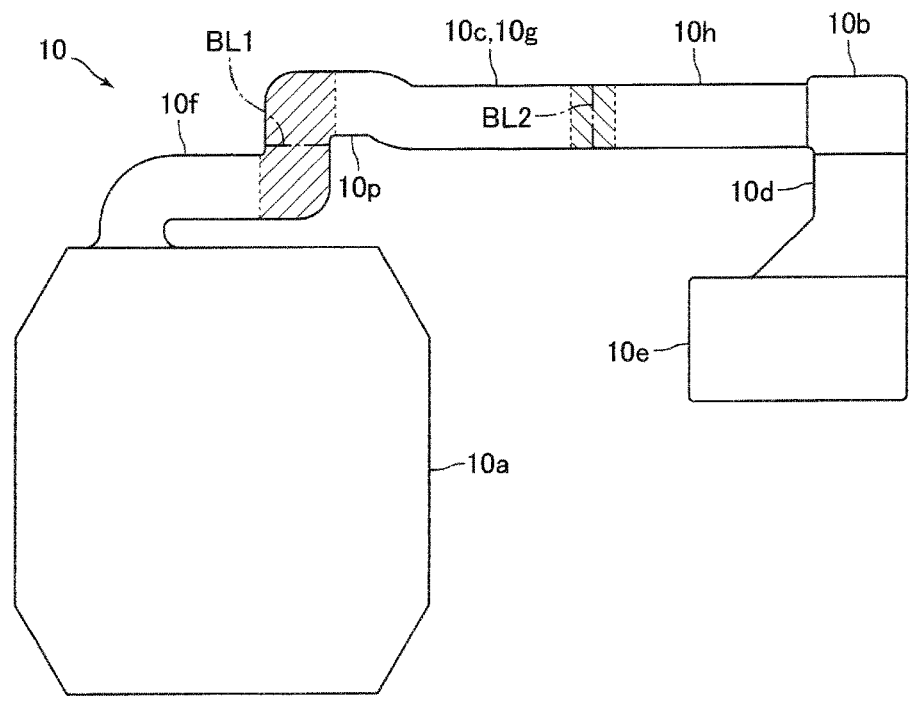
FIGS. 5A and 5B are views illustrating the wiring board before manufacturing the optical unit with a shake correction function shown in FIG. 1.
Figure 5B:
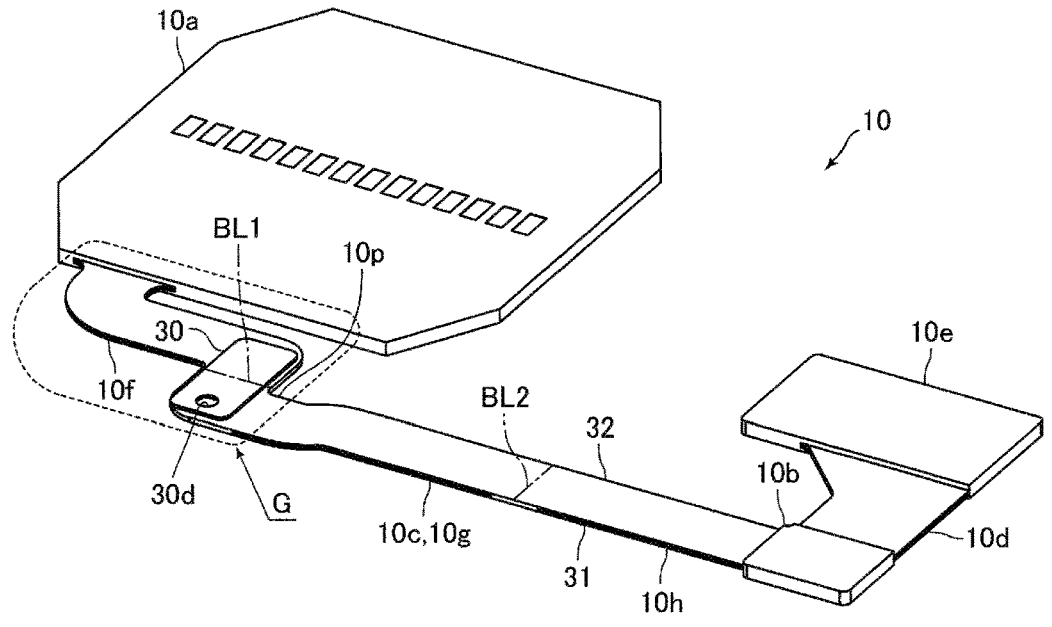
Figure 6A:
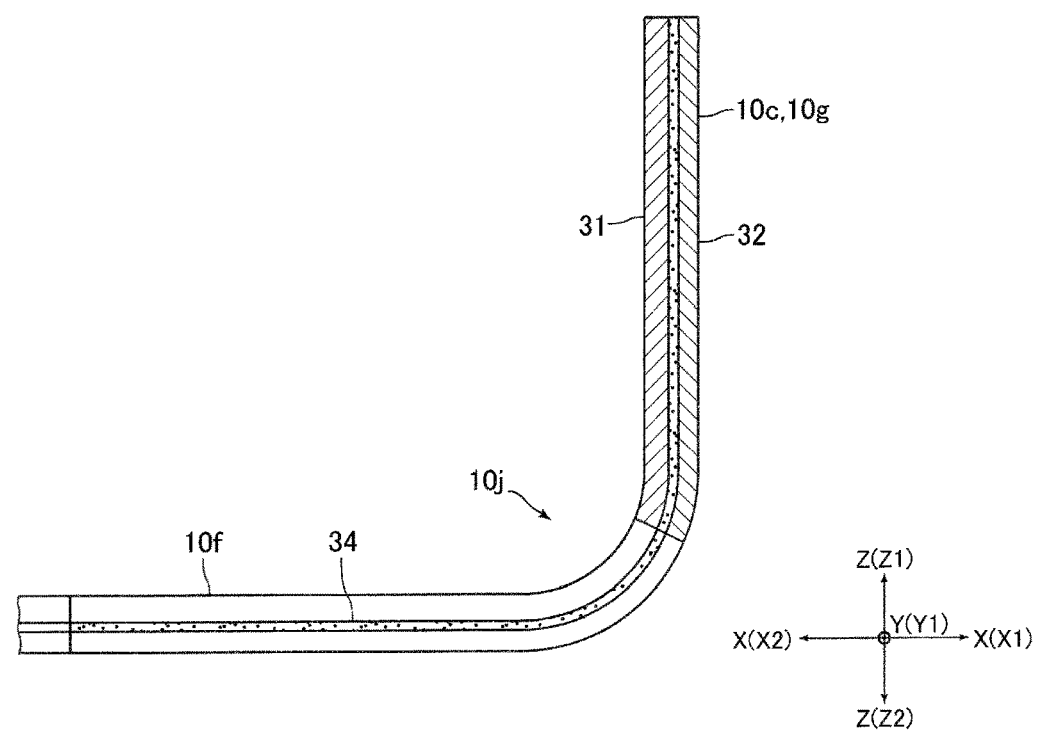
FIG. 6A is a cross-sectional view of an E-E section of FIG. 4A.
Figure 6B:
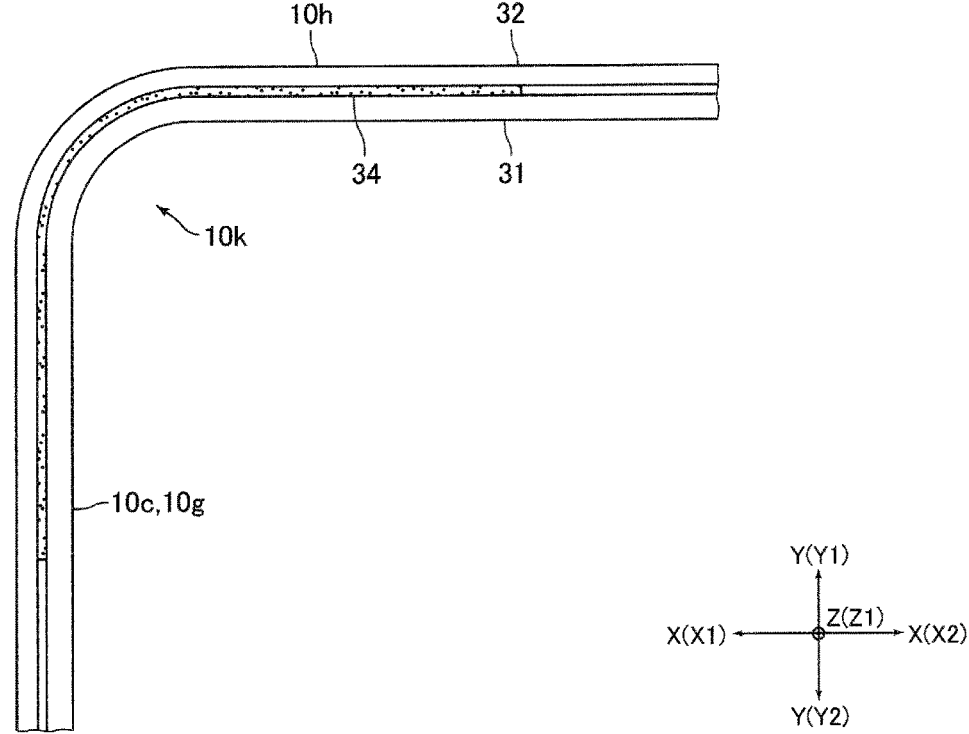
FIG. 6B is an enlarged view of the wiring board from a direction F in FIG. 4A, showing the peripheral portion around the second bent portion.
Figure 7:
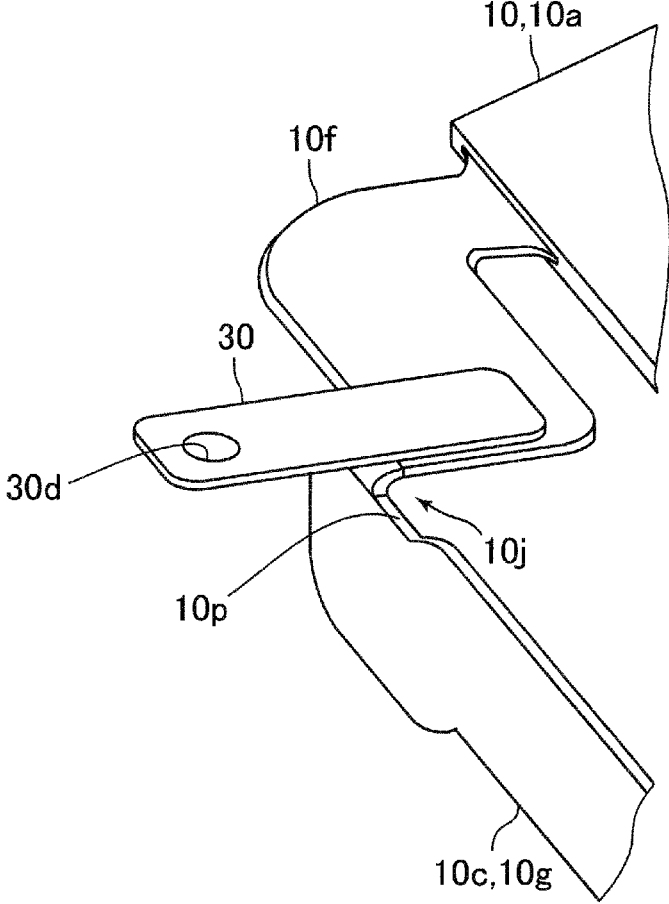
FIG. 7 is a perspective view for explaining a configuration of a part G in FIG. 5B.

FIGS. 4A and 4B are perspective views illustrating the wiring board 10 shown in FIG. 2 from a different direction. FIGS. 5A and 5B are views illustrating the wiring board before manufacturing the optical unit 1 shown in FIG. 1, and FIG. 5A is a plan view, and FIG. 5B is a perspective view of the wiring board 10 shown from the anti-subject side. FIG. 6A is a cross-sectional view of the E-E section of FIG. 4A, and FIG. 6B is an enlarged view of the wiring board 10 from a direction F in FIG. 4A, showing the peripheral portion around the second bent portion 10k. FIG. 7 is a perspective view for explaining a configuration of a part G in FIG. 5B.

The wiring board 10 is a rigid flexible board in which a flexible printed circuit board and a rigid board are integrated. The wiring board 10 has a module-side mounted portion 10a that is mounted on the camera module 2, a fixed-side fixed portion 10b that is fixed to the fixed body 5, a band-shaped portion 10c that connects the module-side mounted portion 10a and the fixed-side fixed portion 10b, a pull-out portion 10d that is pulled out to the outer peripheral side of the fixed body 5, and a connected portion 10e that is connected to the mobile device in which the optical unit 1 is mounted. The wiring board 10 also has a reinforcing plate 30 made of metal and fixed to the band-shaped portion 10c.

The wiring board 10 in this embodiment is constituted by one piece of the module-side mounted portion 10a, one piece of the fixed-side fixed portion 10b, one piece of the band-shaped portion 10c, one piece of the pull-out portion 10d, one piece of the connected portion 10e, and one piece of the metal plate 30. The module-side mounted portion 10a, the fixed-side fixed portion and the connected portion 10e are constituted by a flexible printed circuit board and a rigid board. In the module-side mounted portion 10a, the fixed-side fixed portion 10b, and the connected portion 10e, a flexible printed circuit board and a rigid board are stacked. The pull-out portion 10d is constituted by a flexible printed circuit board.

The module-side mounted portion 10a is fixed to the camera module 2. Specifically, the module-side mounted portion 10a is fixed to an end surface on the anti-subject side of the camera module 2 (that is, a lower end surface of the camera module 2). The module-side mounted portion is disposed so that the thickness direction of the module-side mounted portion 10a matches the optical axis direction of the camera module 2. In other words, the thickness direction of the module-side mounted portion 10a matches the optical axis direction of the camera module 2. An image pickup element is mounted on a surface on the subject side (upper surface) of the module-side mounted portion 10a.

The fixed-side fixed portion 10b is fixed to the fixed surface 17a of the case body 17. The fixed-side fixed portion 10b is disposed so that the thickness direction of the fixed-side fixed portion 10b matches the front-back direction. The pull-out portion 10d is pulled out toward the front side from the lower end of the fixed-side fixed portion 10b. The connected portion 10e connects to the front end of the pull-out portion 10d. The connected portion 10e is connected to a connector provided inside the mobile device in which the optical unit 1 is mounted.

The band-shaped portion 10c is not fixed to the movable body 3 or the fixed body 5. The band-shaped portion 10c is pulled around mainly on the outer peripheral side of the case body 17 and on the inner peripheral side of the cylinder portion 18b of the cover member 18. The band-shaped portion 10c is constituted by a flexible printed circuit board. Specifically, the band-shaped portion 10c is constituted by a plurality of flexible printed circuit boards. The band-shaped portion 10c in this embodiment is constituted by two flexible printed circuit boards. The two flexible printed circuit boards overlap each other with a predetermined gap in the thickness direction of the flexible printed circuit board. Note that, in FIG. 7, the two flexible printed circuit boards are illustrated as one flexible printed circuit board.

In the following explanation, one flexible printed circuit board of the two flexible printed circuit boards constituting the band-shaped portion 10c is referred to as a "first flexible printed circuit board 31" and the other flexible printed circuit board as a "second flexible printed circuit board 32". The first flexible printed circuit board 31 has a two-layer structure with a wiring pattern formed on both sides, while the second flexible printed circuit board 32 has a single-layer structure with the wiring pattern formed on one side.

The thickness of the first flexible printed circuit board 31 is larger than that of the second flexible printed circuit board 32. For example, the thickness of the first flexible printed circuit board 31 is approximately 80 μm, and the thickness of the second flexible printed circuit board 32 is approximately 401 μm. The gap between the first flexible printed circuit board 31 and the second flexible printed circuit board 32 is approximately 10 μm, for example.

The band-shaped portion 10c includes a first band-shaped portion 10f with one end connecting to the module-side mounted portion 10a, a second band-shaped portion 10g with one end side connecting to the other end side of the first band-shaped portion 10f, and a third band-shaped portion 10h with one end connecting to the other end of the second band-shaped portion 10g and the other end connecting to the fixed-side fixed portion 10b. The band-shaped portion 10c in this embodiment is constituted by the first band-shaped portion 10f, the second band-shaped portion 10g, and the third band-shaped portion 10h. The thickness direction of the first band-shaped portion 10f matches the optical axis direction of the camera module 2. The first band-shaped portion 10f extends slightly from the module-side mounted portion 10a toward the right side and then, extends toward the front side.

The band-shaped portion 10c is bent at the boundary between the first band-shaped portion 10f and the second band-shaped portion 10g, and at the boundary between the second band-shaped portion 10g and the third band-shaped portion 10h. The band-shaped portion 10c of this embodiment is bent at the boundary between the first band-shaped portion 10f and the second band-shaped portion 10g, and at the boundary between the second band-shaped portion 10g and the third band-shaped portion 10h at a right angle. In other words, the band-shaped portion 10c is bent at right angle at a first bent portion 10j formed at the boundary part between the first band-shaped portion 10f and the second band-shaped portion 10g, and at a second bent portion 10k formed at the boundary part between the second band-shaped portion 10g and the third band-shaped portion 10h.

The first bent portion 10j and the second bent portions 10k have a curved shape. Specifically, the first bent portion 10j and the second bent portion 10k have a curved shape curved with a ¼-arc shape. In other words, the first bent portion 10j has a curved shape curved with a circular arc having a center angle of 90° centered at the center of curvature of the first bent portion 10j, and the second bent portion 10k has a curved shape curved with a circular arc having a center angle of 90° centered at the center of curvature of the second bent portion 10k.

The band-shaped portion 10c is bent upward at a right angle at the first bent portion 10j. Moreover, the band-shaped portion 10c is bent along a bend line BL1, which is a reference for a bent position at the first bent portion 10j. The boundary between the first band-shaped portion 10f and the second band-shaped portion 10g is the bend line BL1, and the bend line BL1 is a straight line parallel to the front-back direction. The second band-shaped portion 10g extends from a front end part of the first band-shaped portion 10f toward the front side. The width direction of the second band-shaped portion 10g, which is formed having a band shape, matches the optical axis direction of the camera module 2.

The rear end of the second band-shaped portion 10g is disposed closer to the rear side than the front end of the first band-shaped portion 10f In other words, one end of the second band-shaped portion 10g is disposed closer to the one end side of the first band-shaped portion 10f than the other end of the first band-shaped portion 10f. An escape portion 10p for bending the band-shaped portion 10c at a right angle at the first bent portion 10j is formed on the front side of the first bent portion 10j. The escape portion 10p is recessed toward the upper side.

The band-shaped portion 10c is bent to the left side at a right angle at the second bent portion 10k. Moreover, the band-shaped portion 10c is bent along a bend line BL2, which is a reference for a bent position at the second bent portion 10k. The boundary between the second band-shaped portion 10g and the third band-shaped portion 10h is a bend line BL2, and the bend line BL2 is a straight line parallel to the up-down direction. The third band-shaped portion 10h extends from a front end of the second band-shaped portion 10g toward the left side. The width direction of the third band-shaped portion 10h, which is formed having a band shape, matches the optical axis direction of the camera module 2.

As described above, the thickness direction of the first band-shaped portion 10f matches the optical axis direction of the camera module 2. Moreover, the width direction of the second band-shaped portion 10g and the width direction of the third band-shaped portion 10h, which are formed having a band shape, match the optical axis direction of the camera module 2. In other words, the thickness direction of the first band-shaped portion 10f matches the width directions of the second band-shaped portion 10g and the third band-shaped portion 10h. Moreover, the thickness direction of the second band-shaped portion 10g matches the left-right direction, and the thickness direction of the third band-shaped portion 10h matches the front-back direction.

As described above, the band-shaped portion 10c is constituted by two flexible printed circuit boards of the first flexible printed circuit board 31 (hereinafter referred to as "first FPC 31") and the second flexible printed circuit board 32 (hereinafter referred to as "second FPC 32"). The first FPC 31 is disposed on the inner side of the second FPC 32 at the first bent portion 10j and the second bent portion 10k (see FIGS. 6A and 6B).

The first FPC 31 and the second FPC 32 are bonded and fixed to each other at the first bent portion 10j and the second bent portion 10k. In other words, the two flexible printed circuit boards constituting the band-shaped portion 10c are bonded and fixed to each other at the first bent portion 10j and the second bent portions 10k. Moreover, the first FPC 31 and the second FPC 32 are bonded to each other by a sheet-state adhesive 34 at the first bent portion 10j and the second bent portion 10k (see FIGS. 6A and 6B).

The first FPC 31 and the second FPC 32 are bonded and fixed to each other in a whole area of the first bent portion 10j, which has a curved shape. In this embodiment, the first FPC 31 and the second FPC 32 are bonded and fixed to each other in a whole area between the rear end of the second band-shaped portion 10g and the front end of the first band-shaped portion 10f in the front-back direction (that is, a whole area between the one end of the second band-shaped portion 10g and the other end of the first band-shaped portion 10f in the longitudinal direction of the band-shaped portion 10c) and are also bonded and fixed to each other in a whole area in the width direction of the band-shaped portion 10c. In other words, the first FPC 31 and the second FPC 32 are bonded and fixed to each other in a whole area at spots indicated by diagonally right-up hatching in FIG. 5A, and the entire first bent portion 10j is included in the area indicated by the diagonally right-up hatching in FIG. 5A.

Moreover, the first FPC 31 and the second FPC 32 are bonded and fixed to each other in a whole area of the second bent portion 10k, which has a curved shape. In this embodiment, the first FPC 31 and the second FPC 32 are bonded and fixed to each other in a predetermined range from the second bent portion 10k toward the rear side and also in a predetermined range from the second bent portion 10k toward the left side and are bonded and fixed to each other in a whole area in the width direction of the band-shaped portion 10c. In other words, the first FPC 31 and the second FPC 32 are bonded and fixed to each other in a whole area at spots indicated by diagonally right-down hatching in FIG. 5A, and the entire second bent portion 10k is included in the area indicated by the diagonally right-down hatching in FIG. 5A.

The first FPC 31 and the second FPC 32 are not bonded at spots other than the hatched areas shown in FIG. 5A but overlap each other with a predetermined gap in the thickness direction of the first FPC 31 and the second FPC 32. Note that, a bonded range in the longitudinal direction of the band-shaped portion 10c between the first FPC 31 and the second FPC 32 in the peripheral portion of the second bent portion 10k is set so that, even if the position of the second bent portion shifts slightly in the longitudinal direction of the band-shaped portion 10c, the first FPC 31 and the second FPC 32 are bonded and fixed to each other in a whole area of the second bent portion 10k.

The reinforcing plate 30 is formed of a non-magnetic metallic material such as stainless steel, copper alloy or aluminum alloy. The reinforcing plate 30 is formed by bending a rectangular and flat metal plate at a right angle. The reinforcing plate 30 is formed having an L shape. A thickness of the reinforcing plate 30 is, for example, 801 μm. The reinforcing plate 30 functions to maintain the bent shape of the band-shaped portion 10c at the first bent portion 10j. In FIG. 6A, the reinforcing plate 30 is not shown.

As shown in FIG. 4B, the reinforcing plate 30 is constituted by a flat-plate shaped lower surface portion 30a disposed on the lower side of the front end part of the first band-shaped portion 10f, a flat-plate shaped right surface portion 30b disposed on the right side of the rear end part of the second band-shaped portion 10g, and a curved-plate shaped connecting portion 30c which connects the lower surface portion 30a and the right surface portion 30b and is disposed on the lower right side of the first bent portion 10j. The reinforcing plate 30 is disposed on the outer side of the band-shaped portion 10c. Moreover, the reinforcing plate 30 is disposed across the bend line BL1. The reinforcing plate 30 is bent at a right angle at the boundary between the first band-shaped portion 10f and the second band-shaped portion 10g.

The lower surface portion 30a is disposed so that the thickness direction of the lower surface portion 30a matches the up-down direction. The lower surface portion 30a is bonded and fixed to the lower surface of the front end part of the first band-shaped portion 10f. The lower surface portion 30a is fixed to the lower surface of the front end part of the first band-shaped portion 10f by a sheet-state adhesive. The entire lower surface portion 30a is fixed to the lower surface of the front end part of the first band-shaped portion 10f. The right surface portion 30b is disposed so that the thickness direction of the right surface portion 30b matches the left-right direction. The right surface portion 30b is bonded and fixed to the rear end part of the second band-shaped portion 10g. A through hole 30d for applying the adhesive is formed in the right surface portion 30b. The right surface portion 30b is fixed to the right surface of the rear end part of the second band-shaped portion 10g by curing the liquid adhesive that is applied to the through hole 30d.

In the optical unit 1, the second band-shaped portion 10g moves relatively largely with the movement of the camera module 2 when a shake correction is performed in the pitching direction and in the yawing direction, but the third band-shaped portion 10h does not move as large as the second band-shaped portion 10g. Moreover, the second band-shaped portion 10g moves mainly in the up-down direction and the left-right direction with the operation of the camera module 2 when the shake correction is performed in the pitching direction or in the yawing direction, while the third band-shaped portion 10h moves mainly in the up-down direction.

In the wiring board 10 before the optical unit 1 is manufactured, as shown in FIGS. 5A and 5B, the band-shaped portion 10c is formed having an elongated band shape and has a flat shape. In other words, the wiring board 10 before the optical unit 1 is manufactured includes the flat band-shaped portion 10c having a band shape. In the wiring board 10 before the optical unit 1 is manufactured, the first FPC 31 and the second FPC 32 are bonded and fixed at the spots indicated by the hatching in FIG. 5A. In other words, in the manufacturing process of the wiring board 10, the first FPC 31 and the second FPC 32 are bonded and fixed at the spots indicated by the hatching in FIG. 5A.

In this embodiment, when the wiring board 10 is manufactured, the sheet-state adhesive 34 having an area larger than the spot shown in the right-up hatching in FIG. 5A is used to bond and fix the spot indicated by the right-up hatching in FIG. 5A and then, the sheet-state adhesive 34 is cut in accordance with the outline of the band-shaped portion 10c and removed. Moreover, when the wiring board 10 is manufactured, the sheet-state adhesive 34 having an area larger than the spot shown in the right-down hatching in FIG. 5A is used to bond and fix the spot indicated by the right-down hatching in FIG. 5A and then, the sheet-state adhesive 34 is cut in accordance with the outline of the band-shaped portion 10c and removed.

Furthermore, in the wiring board 10 before the optical unit 1 is manufactured, as shown in FIG. 5B, the reinforcing plate 30 is formed having a flat-pate shape. The reinforcing plate 30 is disposed across the bend line BL1. In the wiring board 10 before the optical unit 1 is manufactured, the entire part to be the lower surface portion 30a of the reinforcing plate 30, which is formed having a flat-plate shape, is bonded and fixed to the lower surface of the front end part of the first band-shaped portion 10f, but the part to be the right surface portion 30b of the reinforcing plate is not fixed to the right surface of the rear end part of the second band-shaped portion 10g. (see FIG. 7). In other words, in the wiring board 10 before the optical unit 1 is manufactured, a part of the reinforcing plate 30 (specifically, the lower surface portion 30a) is fixed to the band-shaped portion 10c. Furthermore, in the wiring board 10 before the optical unit 1 is manufactured, the reinforcing plate 30 is bonded and fixed only to the first band-shaped portion 10f and is fixed to the band-shaped portion 10c only on one side of the bend line BL1.

In this embodiment, the module-side mounted portion 10a is fixed to the camera module 2 in advance before the optical unit 1 is manufactured. When the optical unit 1 is manufactured, the reinforcing plate 30 and the band-shaped portion 10c, which are bonded and fixed only to the first band-shaped portion 10f, are bent at a right angle at the boundary between the first band-shaped portion 10f and the second band-shaped portion 10g (bending process). In other words, the band-shaped portion 10c and the reinforcing plate 30 are bent at predetermined positions during manufacture of the optical unit 1. Specifically, the band-shaped portion 10c and the reinforcing plate 30 are bent at a right angle along the bend line BL1 at the boundary between the first band-shaped portion 10f and the second band-shaped portion 10g during manufacture of the optical unit 1. Moreover, the band-shaped portion 10c and the reinforcing plate 30 are bent together.

When the optical unit 1 is manufactured, after the bending process, the reinforcing plate is bonded and fixed to the second band-shaped portion 10g (reinforcing plate bonding process). In the reinforcing plate bonding process, the reinforcing plate 30 is fixed to the second band-shaped portion 10g by applying an adhesive to the through hole 30d from the right side of the right surface portion 30b. Moreover, when the optical unit 1 is manufactured, the fixed-side fixed portion 10b is fixed to the fixed surface 17a of the case body 17.

Main Effect of This Embodiment

As explained above, in this embodiment, the two first FPC 31 and the second FPC 32, which constitute the band-shaped portion 10c, are bonded and fixed to each other at the first bent portion Therefore, in this embodiment, it becomes possible to suppress the shifting of the end surface on the subject side of the first FPC 31 and the end surface on the subject side of the second FPC 32 at the rear end part of the second band-shaped portion 10g connecting to the first band-shaped portion 10f.

Moreover, in this embodiment, the first FPC 31 and the second FPC 32 are bonded and fixed to each other at the second bent portion 10k and thus, it becomes possible to suppress the deflection that occurs in the first FPC 31 disposed on the inner side at the right end part of the third band-shaped portion 10h connecting to the second band-shaped portion 10g. Therefore, in this embodiment, it becomes possible to suppress occurrence of nonconformities in the band-shaped portion 10c, when the band-shaped portion 10c is bent, even if the band-shaped portion is constituted by the first FPC 31 and the second FPC 32 that overlap each other with a predetermined gap.

In this embodiment, the first FPC 31, which has a two-layer structure and a large thickness, is disposed on the inner side of the second FPC 32, which has a one-layer structure and has a smaller thickness, at the first bent portion 10j and the second bent portion 10k. Therefore, in this embodiment, as compared with the case where the first FPC 31 is disposed on the outer side of the second FPC 32 at the first bent portion 10j and the second bent portion 10k, it is easier to bend the band-shaped portion 10c at the first bent portion 10j and the second bent portion 10k and also easier to prevent damage to the first FPC 31 when it is bent at the first bent portion 10j and the second bent portion 10k.

In this embodiment, the first FPC 31 and the second FPC 32 are bonded and fixed to each other in a whole area of the first bent portion 10j, which has a curved shape. Therefore, in this embodiment, it becomes possible to effectively suppress the shifting of the end surface on the subject side of the first FPC 31 and the end surface on the subject side of the second FPC 32 at the rear end part of the second band-shaped portion 10g. Moreover, in this embodiment, the first FPC 31 and the second FPC 32 are bonded and fixed to each other in a whole area of the second bent portion 10k, which has a curved shape and thus, it becomes possible to effectively suppressed the deflection generated in the first FPC 31 at the right end part of the third band-shaped portion 10h.

In this embodiment, the first FPC 31 and the second FPC 32 are bonded and fixed to each other in a whole area between the rear end of the second band-shaped portion 10g and the front end of the first band-shaped portion 10f in the front-back direction, and are bonded and fixed to each other in a whole area in the width direction of the band-shaped portion 10c. Moreover, in this embodiment, when the wiring board 10 is manufactured, the sheet-state adhesive 34 with an area larger than the spot indicated by the right-up hatching in FIG. 5A is used to bond and fix the spot indicated by the right-up hatching in FIG. 5A and then the sheet-state adhesive 34 is cut in accordance with the outline of the band-shaped portion 10c and removed. Therefore, in this embodiment, as compared with the case where the first FPC 31 and the second FPC 32 are bonded and fixed only at the first bent portion 10j using the sheet-state adhesive 34, the bonding and fixing work of the first FPC 31 and the second FPC 32 can be easily performed in the manufacturing process of the wiring board 10.

Modified Example of Optical Unit with Shake-Correction Function

Figure 8:
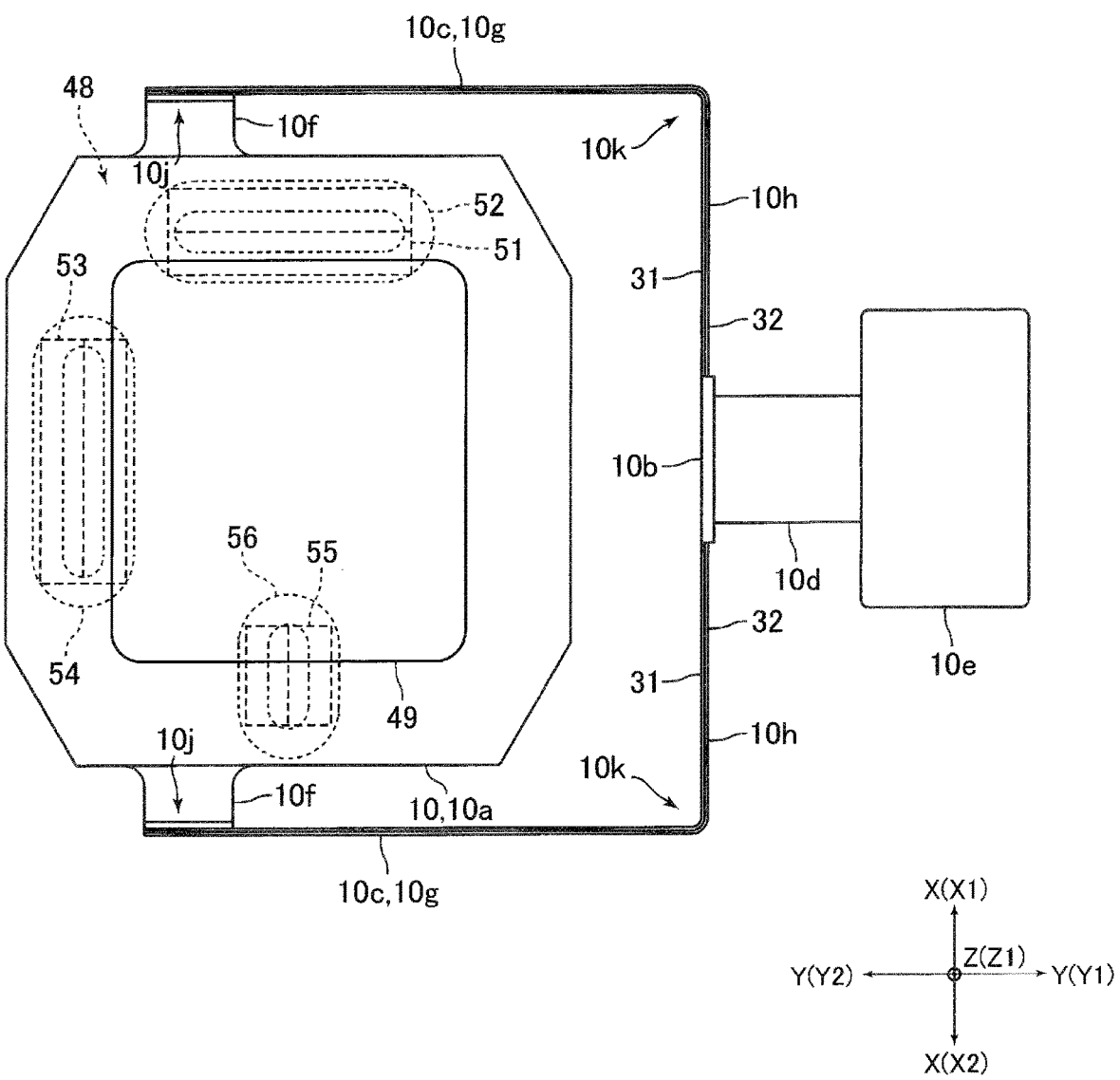
FIG. 8 is a plan view for explaining a configuration of the wiring board and the like according to another embodiment of the present invention.
Figure 9A:
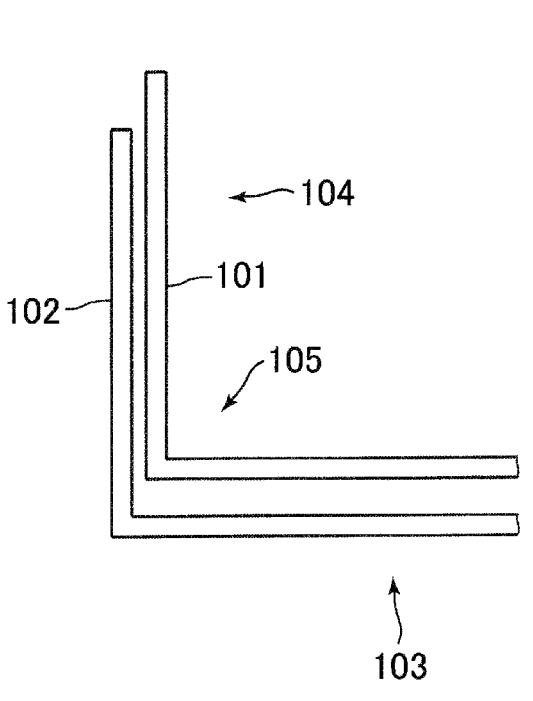
FIGS. 9A and 9B are schematic diagrams for explaining problems with conventional arts.
Figure 9B:
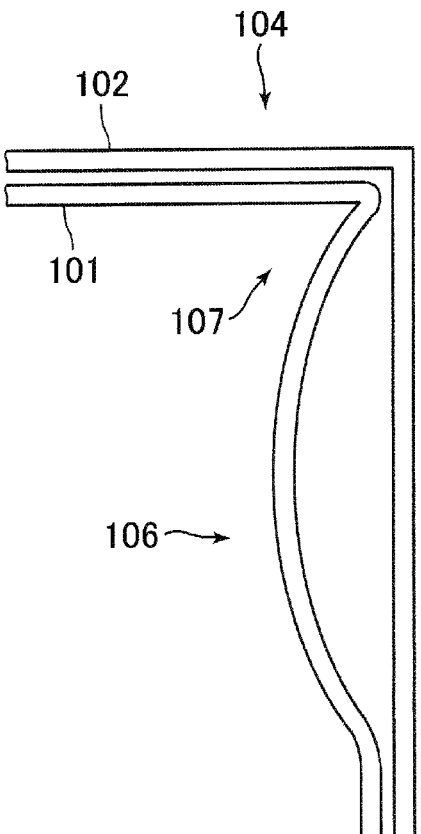

FIG. 8 is a plan view for explaining a configuration of the wiring board 10 and the like according to the embodiment of the present invention.

In the embodiment described above, the movable body 3 with the camera module 2 is rotatable with respect to the fixed body 5, and the optical unit 1 includes the drive mechanisms 8 and 9 for rotating the movable body 3 with respect to the fixed body 5 so that the optical axis L of the camera module 2 is inclined in an arbitrary direction, but it may be so configured that a main body of the camera module 2 is fixed to the fixed body 5 directly or via the holder 16 and is not rotatable with respect to the fixed body 5. Even in this modified example, the camera module 2 is held in the fixed body 5. In this modified example, the optical axis direction of the camera module 2 matches the up-down direction. Moreover, in this modified example, the intermediate member 4, the drive mechanisms 8 and 9, the first fulcrum portion 12, and the second fulcrum portion 13 are no longer necessary.

In this modified example, the module-side mounted portion 10a of the wiring board 10 is movable with respect to a main body of the camera module 2 and the fixed body 5 on a predetermined plane orthogonal to the optical axis of the camera module 2 (predetermined XY plane), and the optical unit 1 includes a drive mechanism 48 for moving the module-side mounted portion 10a with respect to the fixed body 5. The module-side mounted portion 10a is movably mounted on the end part of the anti-subject side of the camera module 2 via a spring member such as a plate spring, for example. An image pickup element 49 of the camera module 2 is mounted on the surface on the subject side (upper surface) of the module-side mounted portion 10a. The image pickup element 49 is movable together with the module-side mounted portion 10a with respect to the main body of the camera module 2 and the fixed body 5. In this modified example, a shake of the optical image is corrected by movement of the image pickup element 49 with respect to the lens of the camera module 2.

The drive mechanism 48 includes, for example, a drive magnet 51 and a drive coil 52 for moving the image pickup element 49 and the module-side mounted portion 10a in the left-right direction, a drive magnet 53 and a drive coil 54 for moving the image pickup element 49 and the module-side mounted portion 10a in the front-back direction, and a drive magnet 55 and a drive coil 56 for rotating the image pickup element 49 and the module-side mounted portion 10a around the optical axis L of the camera module 2. The drive coils 52, 54, and 56 are mounted, for example, on a surface lower surface) on the anti-subject side of the module-side mounted portion 10a. The drive magnets 51, 53, and 55 are fixed to the fixed body 5. The drive magnet 51 is disposed on the lower side of the drive coil 52, the drive magnet 53 is disposed on the lower side of the drive coil 54, and the drive magnet 55 is disposed on the lower side of the drive coil 56.

In this modified example, when a change in the inclination of the camera module 2 is detected by the predetermined detection mechanism for detecting a change in the inclination of the camera module 2, an electric current is supplied to at least any one of the drive coils 52, 54, 56 on the basis of the detection result of this detection mechanism so that the shake is corrected.

In this modified example, the wiring board 10 has, for example, two band-shaped portions 10c. In one band-shaped portion 10c of the two band-shaped portions 10c, the first band-shaped portion 10f extends from the module-side mounted portion 10a toward the right side. Moreover, in the one band-shaped portion 10c, the second band-shaped portion 10g extends from the right end of the first band-shaped portion 10f toward the front side, and the third band-shaped portion extends from the front end of the second band-shaped portion 10g toward the left side. The left end of the third band-shaped portion 10h connects to the fixed-side fixed portion 10b.

In the other band-shaped portion 10c of the two band-shaped portions 10c, the first band-shaped portion 10f extends from the module-side mounted portion 10a toward the left side. Moreover, in the other band-shaped portion 10c, the second band-shaped portion 10g extends from the left end of the first band-shaped portion 10f toward the front side, and the third band-shaped portion 10h extends from the front end of the second band-shaped portion 10g toward the right side. The right end of the third band-shaped portion 10h connects to the fixed-side fixed portion 10b. The fixed-side fixed portion 10b is, for example, fixed to the center part in the front-back direction of the case body 17.

In this modified example, the drive mechanism 48 does not have to include the drive magnet 55 and the drive coil 56. Moreover, in this modified example, the drive mechanism 48 does not have to include the drive magnets 51, 53 and the drive coils 52, 54. Furthermore, in this modified example, too, the reinforcing plate 30, which is bent at a right angle at the boundary between the first band-shaped portion 10f and the second band-shaped portion 10g, is fixed to the band-shaped portion 10c, but the illustration of the reinforcing plate 30 is omitted in FIG. 8. Furthermore, in this modified example, the wiring board 10 may include only one band-shaped portion 10c, as in the embodiment described above.

OTHER EMBODIMENTS

The embodiment described above is an example of at least an embodiment of the present invention but it is not limiting, and various modifications can be made within a range not changing the gist of at least an embodiment of the present invention.

In the embodiment described above, the first FPC 31 and the second FPC 32 do not have to be bonded and fixed to each other in a whole area between the rear end of the second band-shaped portion 10g and the front end of the first band-shaped portion 10f in the front-back direction. In this case, the first FPC 31 and the second FPC 32 may be bonded and fixed to each other in a whole area of the first bent portion 10j, in a predetermined range from the first bent portion 10j toward the left side, and in a predetermined range from the first bent portion 10j toward the upper side. Moreover, the first FPC 31 and the second FPC 32 may be bonded and fixed to each other only in a whole area of the first bent portion 10j or only in a part of the first bent portion 10j. Furthermore, in the embodiment described above, the first FPC 31 and the second FPC 32 may be bonded and fixed to each other only in a whole area of the second bent portion 10k or may be bonded and fixed to each other only in a part of the second bent portion 10k.

In the embodiment described above, the second FPC 32 may have a two-layer structure with a wiring pattern formed on the both surface sides. Moreover, in the embodiment described above, the first FPC 31 may be disposed on the outer side of the second FPC 32 at the first bent portion 10j and the second bent portion 10k. Furthermore, in the embodiment described above, the band-shaped portion 10c may be bent at an acute angle or at an obtuse angle at the first bent portion 10j. Furthermore, in the embodiment described above, the band-shaped portion 10c may be bent at an acute angle or at an obtuse angle at the second bent portion 10k.

In the embodiment described above, the band-shaped portion 10c may be constituted by three or more flexible printed circuit boards. For example, the band-shaped portion 10c may be constituted by three flexible printed circuit boards. In this case, for example, a flexible printed circuit board having a one-layer structure in which a wiring pattern is formed on one side, a flexible printed circuit board having a two-layer structure in which the wiring pattern is formed on both sides, and a flexible printed circuit board having a one-layer structure in which the wiring pattern is formed on one side overlap one another in the thickness direction of the flexible printed circuit boards in this order with a predetermined gap between them.

In the embodiment described above, the wiring board 10 is a rigid flexible board, but the wiring board 10 may also be a flexible printed circuit board. In this case, for example, the module-side mounted portion 10*a*, the fixed-side fixed portion 10*b*, and the connected portion 10*e* are fixed to a flat-plate shaped reinforcing plate. This reinforcing plate is formed, for example, of FR-4, glass epoxy or the like, or by a metal plate such as stainless steel plate. Moreover, In the embodiment described above, the right surface portion 30*b* of the reinforcing plate 30 does not have to be fixed to the second band-shaped portion 10*g*. Moreover, in the embodiment described above, the wiring board 10 does not have to include the reinforcing plate 30.

In the embodiment described above, the optical unit 1 may include a rotation mechanism for rotating the camera module 2 with respect to the intermediate member 4 with the optical axis L of the camera module 2 as the rotation center. In this case, the rotation mechanism includes a drive coil mounted on the wiring board 11 and a drive magnet disposed by opposing the drive coil. Also, in this case, the intermediate member 4 includes a first intermediate member and a second intermediate member. The movable body 3 is rotatable with respect to the first intermediate member with the optical axis L of the camera module 2 as the rotation center, and the first intermediate member is rotatable with respect to the second intermediate member with the first axis L1 as the rotation center.

Moreover, if the optical unit 1 includes a rotation mechanism for rotating the camera module 2 with the optical axis L of the camera module 2 as the rotation center, the optical unit 1 does not have to include the drive mechanisms 8, 9. In this case, for example, the movable body 3 is rotatable with respect to the fixed body 5 with the optical axis L of the camera module 2 as the rotation center. Moreover, in this case, the intermediate member 4, the first fulcrum portion 12, and the second fulcrum portion 13 are not required.

In the embodiment described above, the fixed body 5 may hold the movable body 3 rotatably via a plate spring so that the optical axis L of the camera module 2 is inclined in an arbitrary direction. In this case, the plate spring includes, for example, a fixed portion on a movable side to be fixed to the holder 16, a fixed portion on a fixed side to be fixed to the case 17, and an arm portion connecting the fixed portion on the movable side and the fixed portion on the fixed side. Moreover, in this case, the optical unit 1 does not have to include the intermediate member 4, the first fulcrum portion 12 and the second fulcrum portion 13.

In the embodiment described above, the first FPC 31 and the second FPC 32 do not have to be bonded to each other at the second bent portion 10*k*. Moreover, in the embodiment described above, the first FPC 31 and the second FPC 32 do not have to be bonded to each other at the first bent portion 10*j*. Furthermore, in the embodiment described above, the optical unit 1 may be mounted in various devices other than the mobile devices.

Configuration of Present Art

Note that the present art can be configured as follows.

(1) In an optical unit with a shake correction function, including a camera module, a fixed body holding the camera module, and a wiring board connecting to the camera module, characterized in that the wiring board has a module-side mounted portion that is mounted on the camera module, a fixed-side fixed portion that is fixed to the fixed body, and a band-shaped portion that connects the module-side mounted portion and the fixed-side fixed portion, the band-shaped portion includes a first band-shaped portion with one end connecting to the module-side mounted portion, a second band-shaped portion with one end side connecting to the other end side of the first band-shaped portion, and a third band-shaped portion with one end connecting to the other end of the second band-shaped portion and the other end connecting to the fixed-side fixed portion, is constituted by a plurality of flexible printed circuit boards, and is bent at a boundary between the first band-shaped portion and the second band-shaped portion and at a boundary between the second band-shaped portion and the third band-shaped portion, the thickness direction of the first band-shaped portion matches the width direction of the second band-shaped portion and the width direction of the third band-shaped portion, which are formed having a band shape, and the plurality of flexible printed circuit boards overlap each other with a predetermined gap in the thickness direction of the flexible printed circuit boards and are bonded and fixed to each other at least at either one of the first bent portion formed at the boundary portion between the first band-shaped portion and the second band-shaped portion and the second bent portion formed at the boundary portion between the second band-shaped portion and the third band-shaped portion.

(2) The optical unit with a shake correction function described in (1), characterized in that the plurality of flexible printed circuit boards are bonded and fixed to each other at the first bent portion and the second bent portion.

(3) The optical unit with a shake correction function described in (1) or (2), characterized in that the band-shaped portion is bent at a right angle at the first bent portion and the second bent portion.

(4) The optical unit with a shake correction function described in any one of (1) to (3), including a movable body having the camera module, the fixed body that rotatably holds the movable body, and a drive mechanism for rotating the movable body with respect to the fixed body so that an optical axis of the camera module is inclined in an arbitrary direction, characterized in that the module-side mounted portion is fixed to the camera module.

(5) The optical unit with a shake correction function described in any one of (1) to (3), characterized by including a drive mechanism for causing the module-side mounted portion capable of moving with respect to the fixed body on a predetermined plane orthogonal to the optical axis of the camera module to move with respect to the fixed body.

(6) The optical unit with a shake correction function described in any one of (1) to (5), characterized in that the band-shaped portion is constituted by the two flexible printed circuit boards, by assuming that the one flexible printed circuit board of the two flexible printed circuit boards is a first flexible printed circuit board, and the other flexible printed circuit board is a second flexible printed circuit board, the first flexible printed circuit board has a two-layer structure with a wiring pattern formed on both sides,

the second flexible printed circuit board has a one-layer structure with a wiring pattern formed on one side, and the first flexible printed circuit board is disposed on an inner side of the second flexible printed circuit board at the first bent portion and the second bent portion.

(7) The optical unit with a shake correction function described in any one of (1) to (6), characterized in that the plurality of flexible printed circuit boards are bonded and fixed to each other at the first bent portion, the first bent portion has a curved shape, and the plurality of flexible printed circuit boards are bonded and fixed to each other on a whole area of the first bent portion having a curved shape.

(8) The optical unit with a shake correction function described in (7), characterized in that one end of the second band-shaped portion is disposed closer to one end side of the first band-shaped portion than the other end of the first band-shaped portion, and the plurality of flexible printed circuit boards are bonded and fixed to each other on a whole area between one end of the second band-shaped portion and the other end of the first band-shaped portion in a longitudinal direction of the band-shaped portion.

(9) The optical unit with a shake correction function described in any one of (1) to (8), characterized in that the plurality of flexible printed circuit boards are bonded and fixed to each other at the second bent portion, the second bent portion has a curved shape, and the plurality of flexible printed circuit boards are bonded and fixed to each other on a whole area of the second bent portion having a curved shape.

What is claimed is:

1. An optical unit with a shake correction function, comprising:

a camera module, a fixed body to hold the camera module, and a wiring board connecting to the camera module, wherein the wiring board includes a module-side mounted portion mounted on the camera module, a fixed-side fixed portion fixed to the fixed body, and a band-shaped portion connecting the module-side mounted portion and the fixed-side fixed portion;

the band-shaped portion includes a first band-shaped portion with one end connecting to the module-side mounted portion, a second band-shaped portion with one end connecting to another end of the first band-shaped portion, and a third band-shaped portion with one end connecting to another end of the second band-shaped portion and another end of the third band-shaped portion connecting to the fixed-side fixed portion, is constituted by a plurality of flexible printed circuit boards, and is bent at a boundary between the first band-shaped portion and the second band-shaped portion and at a boundary between the second band-shaped portion and the third band-shaped portion;

a thickness direction of the first band-shaped portion matches a width direction of the second band-shaped portion and a width direction of the third band-shaped portion, which are formed having a band shape; and the plurality of flexible printed circuit boards overlap each other with a predetermined gap in the thickness direction of the flexible printed circuit boards and are bonded and fixed to each other at least at either one of a first bent portion formed at a boundary part between the first band-shaped portion and the second band-shaped portion and a second bent portion formed at a boundary part between the second band-shaped portion and the third band-shaped portion.

2. The optical unit with a shake correction function according to claim 1, wherein the plurality of flexible printed circuit boards are bonded and fixed to each other at the first bent portion and the second bent portion.

3. The optical unit with a shake correction function according to claim 1, wherein the band-shaped portion is bent at a right angle at the first bent portion and the second bent portion.

4. The optical unit with a shake correction function according to claim 1, further comprising:

a movable body having the camera module, the fixed body to rotatably hold the movable body, and a drive mechanism to rotate the movable body with respect to the fixed body such that an optical axis of the camera module is inclined in an arbitrary direction, wherein the module-side mounted portion is fixed to the camera module.

5. The optical unit with a shake correction function according to claim 1, further comprising:

a drive mechanism to cause the module-side mounted portion capable of moving with respect to the fixed body on a predetermined plane orthogonal to an optical axis of the camera module to move with respect to the fixed body.

6. The optical unit with a shake correction function, according to claim 1, wherein the band-shaped portion is constituted by two of the flexible printed circuit boards, by assuming that one flexible printed circuit board of the two flexible printed circuit boards is a first flexible printed circuit board, and the other flexible printed circuit board is a second flexible printed circuit board;

the first flexible printed circuit board has a two-layer structure with a wiring pattern formed on both sides;

the second flexible printed circuit board has a one-layer structure with the wiring pattern formed on one side; and the first flexible printed circuit board is disposed on an inner side of the second flexible printed circuit board at the first bent portion and the second bent portion.

7. The optical unit with a shake correction function according to claim 1, wherein the plurality of flexible printed circuit boards are bonded and fixed to each other at the first bent portion;

the first bent portion has a curved shape; and the plurality of flexible printed circuit boards are bonded and fixed to each other on a whole area of the first bent portion having a curved shape.

8. The optical unit with a shake correction function according to claim 7, wherein one end of the second band-shaped portion is disposed closer to one end side of the first band-shaped portion than the other end of the first band-shaped portion, and the plurality of flexible printed circuit boards are bonded and fixed to each other on a whole area between one end of the second band-shaped portion and the other end of the first band-shaped portion in a longitudinal direction of the band-shaped portion.

9. The optical unit with a shake correction function according to claim 1, wherein the plurality of flexible printed circuit boards are bonded and fixed to each other at the second bent portion;

the second bent portion has a curved shape; and the plurality of flexible printed circuit boards are bonded and fixed to each other on a whole area of the second bent portion having a curved shape.

* * * * *